United States Patent
Yang et al.

(10) Patent No.: US 10,985,426 B2
(45) Date of Patent: Apr. 20, 2021

(54) SEPARATOR FOR LITHIUM SECONDARY BATTERY, METHOD FOR MANUFACTURING SAME, AND LITHIUM SECONDARY BATTERY INCLUDING SAME

(71) Applicants: Samsung SDI Co., Ltd., Yongin-si (KR); SAMSUNG ELECTRONICS CO., LTD., Suwon-si (KR); DANKOOK UNIVERSITY CHEONAN CAMPUS INDUSTRY ACADEMIC COOPERATION FOUNDATION, Cheonan-si (KR)

(72) Inventors: Seung Rim Yang, Seongnam-si (KR); Chang Hyun Lee, Seongnam-si (KR); Sung Soo Han, Hwaseong-si (KR); Myungkook Park, Suwon-si (KR); Minho Cho, Suwon-si (KR)

(73) Assignees: Samsung SDI Co., Ltd, Yongin-si (KR); Samsung Electronics Co., Ltd., Suwon-si (KR); Dankook University Cheonan Campus Industry Academic Cooperation Foundation, Cheonan-si (KR)

( * ) Notice: Subject to any disclaimer, the term of this patent is extended or adjusted under 35 U.S.C. 154(b) by 176 days.

(21) Appl. No.: 16/326,885

(22) PCT Filed: Aug. 29, 2017

(86) PCT No.: PCT/KR2017/009438
§ 371 (c)(1),
(2) Date: Feb. 20, 2019

(87) PCT Pub. No.: WO2018/044046
PCT Pub. Date: Mar. 8, 2018

(65) Prior Publication Data
US 2019/0189987 A1 Jun. 20, 2019

(30) Foreign Application Priority Data

Aug. 30, 2016 (KR) .................. 10-2016-0110913

(51) Int. Cl.
*H01M 4/02* (2006.01)
*H01M 50/411* (2021.01)
(Continued)

(52) U.S. Cl.
CPC .......... *H01M 50/411* (2021.01); *C08L 81/06* (2013.01); *H01M 4/525* (2013.01);
(Continued)

(58) Field of Classification Search
None
See application file for complete search history.

(56) References Cited

U.S. PATENT DOCUMENTS

2012/0189896 A1  7/2012  Zhou et al.
2017/0092915 A1* 3/2017  Ku ................. C08F 220/18

FOREIGN PATENT DOCUMENTS

CN  104272499 A  1/2015
CN  105226224 A  1/2016
(Continued)

OTHER PUBLICATIONS

Kim, Joonseok et al., "Mesoporous ceria-silica/poly(arylene ether sulfone) composite membranes for durability of fuel cell electrolyte membrane", Microporous and Mesoporous Materials, Jan. 2016, 33pp.
(Continued)

*Primary Examiner* — Jacob B Marks
(74) *Attorney, Agent, or Firm* — Lewis Roca Rothgerber Christie LLP

(57) ABSTRACT

The present invention relates to a separator for a lithium secondary battery, a method for manufacturing the separator,
(Continued)

and a lithium secondary battery including the separator. The separator includes a porous substrate and a heat resistance porous layer positioned on at least one surface of the porous substrate, wherein the heat resistance porous layer includes a sulfonic acid group-containing polysulfone.

15 Claims, 6 Drawing Sheets

(51) Int. Cl.
 *H01M 4/525* (2010.01)
 *H01M 10/0525* (2010.01)
 *H01M 50/40* (2021.01)
 *H01M 50/403* (2021.01)
 *H01M 50/409* (2021.01)
 *C08L 81/06* (2006.01)
 *C08K 3/22* (2006.01)

(52) U.S. Cl.
 CPC ....... *H01M 10/0525* (2013.01); *H01M 50/40* (2021.01); *H01M 50/403* (2021.01); *H01M 50/409* (2021.01); *C08K 3/22* (2013.01); *C08K 2003/2227* (2013.01); *C08L 2203/20* (2013.01); *H01M 2004/028* (2013.01)

(56) References Cited

FOREIGN PATENT DOCUMENTS

| | | |
|---|---|---|
| JP | 2000-268799 A | 9/2000 |
| JP | 2010-123383 A | 6/2010 |
| JP | 2012-522333 A | 9/2012 |
| JP | 2012-190731 A | 10/2012 |
| JP | 5420938 B2 | 11/2013 |
| JP | 2016-24879 A | 2/2016 |
| JP | 2016-54302 A | 4/2016 |
| KR | 10-2005-0030763 A | 3/2005 |
| KR | 10-0727248 B1 | 6/2007 |
| KR | 10-2010-0098234 A | 9/2010 |
| KR | 1020110130628 | 12/2011 |
| KR | 10-2013-0083211 A | 7/2013 |
| KR | 10-1348865 B1 | 12/2013 |
| KR | 10-2014-0139135 A | 12/2014 |
| KR | 10-1494289 B1 | 2/2015 |
| KR | 10-2015-0039379 A | 4/2015 |
| KR | 10-1560422 B1 | 10/2015 |
| KR | 10-2015-0143361 A | 12/2015 |
| KR | 10-2016-0023317 A | 3/2016 |
| KR | 10-2016-0054937 A | 5/2016 |
| KR | 10-2016-0080778 A | 7/2016 |
| KR | 10-2016-0128134 A | 11/2016 |
| KR | 10-2016-0128140 A | 11/2016 |
| KR | 10-2017-0113915 A | 10/2017 |
| KR | 10-2017-0113917 A | 10/2017 |
| WO | WO 2016/175502 A1 | 11/2016 |

OTHER PUBLICATIONS

Office Action (including SR) dated Feb. 7, 2021, of the corresponding Chinese Patent Application No. 201780052871.X (18 pages).

\* cited by examiner

SEPARATOR FOR LITHIUM SECONDARY BATTERY, METHOD FOR MANUFACTURING SAME, AND LITHIUM SECONDARY BATTERY INCLUDING SAME

CROSS-REFERENCE TO RELATED APPLICATION(S)

This application is a National Phase Patent Application of International Patent Application Number PCT/KR2017/009438, filed on Aug. 29, 2017, which claims priority of Korean Patent Application No. 10-2016-0110913, filed Aug. 30, 2016. The entire contents of both of which are incorporated herein by reference.

TECHNICAL FIELD

A separator for a lithium rechargeable battery, a method of manufacturing the same, and a lithium rechargeable battery including the same are disclosed.

BACKGROUND ART

A separator for an electrochemical battery separates a positive electrode from a negative electrode and continuously maintains ion conductivity in a battery and thus makes the battery charged and discharged but mechanically shrinks or is damaged due to melting characteristics at a low temperature. Herein, the positive and negative electrodes contact each other and may cause an explosion of the battery. In order to overcome this problem, technology of suppressing a shrinkage of the separator at a high temperature is required. The technology of suppressing a shrinkage of the separator may be representatively a method of mixing an inorganic particle having high thermal resistance with an organic binder having adherence and then, coating the mixture on the separator to increase thermal resistance of the separator.

In this way, research on improving safety of the battery and simultaneously, adherence, workability, and the like of the separator has been actively made by suppressing a direct contact of the positive and negative electrodes to prevent the shrinkage of the separator despite excessive increase of an internal temperature of the battery in an unexpected environment.

On the other hand, requirement of developing a large capacity battery has increased a role of the separator. The separator in the large capacity battery needs to be designed to improve electrochemical safety and performance as well as to have high thermal stability.

DISCLOSURE

Technical Problem

Example embodiments provide a separator capable of trapping metal ions eluted from a positive electrode effectively and may prevent the metal ions from being deposited on a negative electrode positive electrode, and having improved heat resistance and a method of manufacturing the same. Example embodiments provide a lithium rechargeable battery having improved safety and performance such as cycle-life characteristics and the like by including the separator.

Technical Solution

In an embodiment, a separator for a lithium rechargeable battery includes a porous substrate and a heat resistance porous layer disposed on at least one surface of the porous substrate, wherein the heat resistance porous layer includes a sulfonic acid group-containing polysulfone.

In an embodiment, a method of manufacturing a separator for a lithium rechargeable battery includes dispersing a sulfonic acid group-containing polysulfone in a low-boiling-point solvent into a nano-size to prepare nano dispersion liquid, applying the nano dispersion liquid on at least one surface of the porous substrate, and obtaining a separator including a heat resistance porous layer including sulfonic acid group-containing polysulfone on at least one surface of the porous substrate.

In an embodiment, a lithium rechargeable battery includes a positive electrode, a negative electrode, and the separator between the positive electrode and the negative electrode.

Advantageous Effects

The separator for a lithium rechargeable battery according to an embodiment may trap metal ions eluted from a positive electrode effectively, and may prevent the metal ions from being deposited on a negative electrode and may have improved heat resistance. A lithium rechargeable battery including the separator has improved safety and performance such as cycle-life characteristics.

DESCRIPTION OF SYMBOLS

Figure 1:
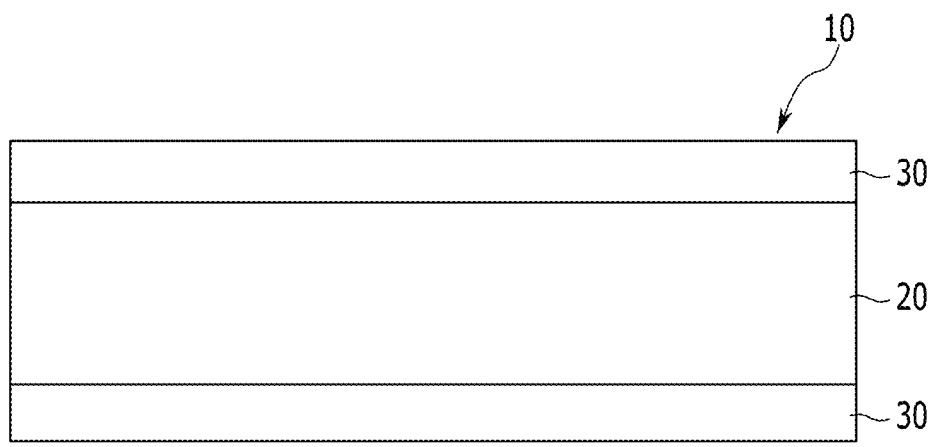
FIG. 1 is a cross-sectional view showing a separator for a lithium rechargeable battery according to an embodiment.

10: separator
20: porous substrate
30: heat resistance porous layer
40: positive electrode
50: negative electrode
60: electrode assembly
70: case

MODE FOR INVENTION

Hereinafter, embodiments of the present invention are described in detail. The disclosures that are not described in the present specification may be fully recognized and by conveyed by those skilled in the art in a technical or similar field of the present disclosure and thus are omitted herein.

Hereinafter, a separator for a rechargeable battery according to an embodiment is described. FIG. 1 is a cross-sectional view of a separator for a lithium rechargeable battery according to an embodiment. Referring to FIG. 1, a separator 10 for a rechargeable battery according to an embodiment includes a porous substrate 20 and a heat resistance porous layer 30 disposed on one surface or both surfaces of the porous substrate 20.

The porous substrate 20 may have a plurality of pore and may generally be a porous substrate used in an electrochemical device. Non-limiting examples of the porous substrate may be a polymer film formed of a polymer, or a copolymer or a mixture of two or more of polyolefin such as polyethylene, polypropylene and the like, a polyester such as polyethyleneterephthalate, polybutyleneterephthalate, and the like, polyacetal, polyamide, polyimide, polycarbonate, polyetheretherketone, polyaryletherketone, polyetherimide, polyamideimide, polybenzimidazole, polyethersulfone, polyphenylene oxide, a cyclic olefin copolymer, polyphenylene sulfide, polyethylenenaphthalate, a glass fiber, Teflon, and polytetrafluoroethylene.

For example, the porous substrate may be a polyolefin-based substrate, and the polyolefin-based substrate may improve has safety of a battery due to its improved shutdown function. The polyolefin-based substrate may be, for example, selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate may have a thickness of about 1 μm to about 40 μm, for example about 1 μm to about 30 μm, about 1 μm to about 20 μm, about 5 μm to about 15 μm, or about 5 μm to about 10 μm.

The heat resistance porous layer 30 according to an embodiment includes sulfonic acid group-containing polysulfone (sulfonated polysulfone). The sulfonic acid group refers to $-SO_3H$, $-SO_3^-$, or $-SO_3^-M^+$, wherein $M^+$ is a monovalent cation element or compound such as $Li^+$, $Na^+$, $K^+$, $Rb^+$, or $NH_4^+$. The polysulfone means a polymer including a sulfone group, that is, $-S(=O)_2-$ in a main chain. The sulfonic acid group-containing polysulfone means a polymer including a sulfone group in a main chain and including a sulfonic acid group.

In the heat resistance porous layer 30 of the separator for a lithium rechargeable battery, the sulfonic acid group-containing polysulfone may realize excellent heat resistance due to a polysulfone main chain having a $-SO_2-$ bond, and may trap metal ions eluted from a positive electrode effectively and may prevent the metal ions from being deposited on a negative electrode due to the sulfonic acid group, and thus safety and performance of a lithium rechargeable battery may be remarkably improved.

For example, a large-capacity lithium rechargeable battery manufactured by applying a positive active material including nickel has a problem of battery performance deterioration due to deposition of nickel ions eluted from a positive electrode on a negative electrode. When a separator according to an embodiment is applied to this battery, the separator may effectively trap the eluted nickel ions and thus prevent the deposition of the nickel ions on the negative electrode and also secure excellent heat resistance. Accordingly, safety and performance of the large capacity battery may be improved.

The sulfonic acid group-containing polysulfone may include, for example a unit represented by Chemical Formula 1.

[Chemical Formula 1]

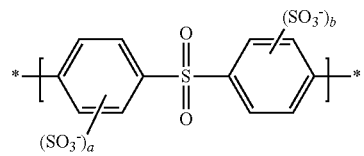

In Chemical Formula 1, a and b are independently numbers of 0 to 4, and the sum of a and b is greater than or equal to 1. The a and b may be, for example, independently, a number of 0 to 2, or a number of 0 to 1, and the sum of a and b may be, for example greater than or equal to 1 and less than or equal to 8, or greater than or equal to 1 and less than or equal to 4, or greater than or equal to 1 and less than or equal to 3, or greater than or equal to 1 and less than or equal to 2. For example, the a and b may independently 1.

In Chemical Formula 1 or post-described chemical formulae, $-SO_3^-$ may be present in a form of $-SO_3H$ or $-SO_3^-M^+$. $M^+$ is the same as described above.

The sulfonic acid group-containing polysulfone including a unit represented by Chemical Formula 1 exhibits excellent heat resistance and effectively traps eluted metal ions in the heat resistance porous layer 30.

The unit represented by Chemical Formula 1 may be, for example represented by Chemical Formula 1-1.

[Chemical Formula 1-1]

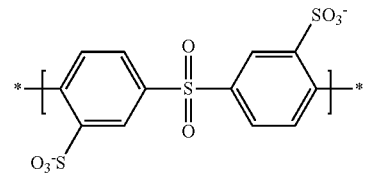

A separator for a lithium rechargeable battery including a heat resistance porous layer including the sulfonic acid group-containing polysulfone including a unit represented by Chemical Formula 1-1 has excellent heat resistance and metal ion trapping performance.

The sulfonic acid group-containing polysulfone may be, for example sulfonic acid group-containing polyarylene ethersulfone (sulfonated poly arylene ether sulfone). For example, the sulfonic acid group-containing polysulfone may include a unit represented by Chemical Formula 2.

[Chemical Formula 2]

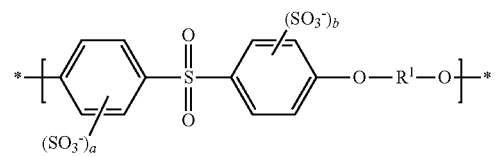

In Chemical Formula 2, a and b are independently numbers of 0 to 4, the sum of a and b is greater than or equal to 1, $R^1$ is a divalent functional group including a C3 to C30 aromatic ring, wherein the aromatic ring is present alone or two or more aromatic rings are linked by a single bond, $-O-$, $-S-$, $-C(=O)-$, $-CH(OH)-$, $-S(=O)_2-$, —NH—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH.

The C3 to C30 aromatic ring may be an aromatic ring compound, for example, benzene, pyrrole, furan, thiophene, pyridine, pyrazine, naphthalene, quinoline, anthracene, or phenanthrene.

When the heat resistance porous layer of the separator includes the sulfonic acid group-containing polysulfone including the unit represented by Chemical Formula 2, the separator has excellent heat resistance and metal ion trapping capability.

For example, the sulfonic acid group-containing polysulfone may be represented by Chemical Formula 3.

[Chemical Formula 3]

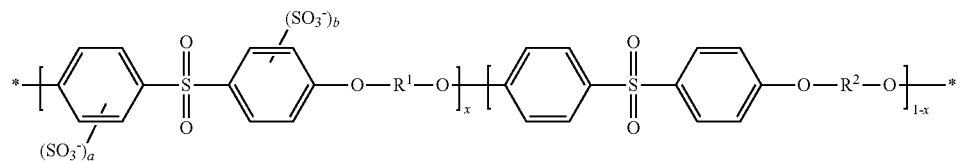

In Chemical Formula 3, a and b are independently numbers of 0 to 4, the sum of a and b is greater than or equal to 1, R$^1$ and R$^2$ are the same or different, and are independently a divalent functional group including a C3 to C30 aromatic ring, wherein the aromatic ring is present alone or two or more aromatic rings are linked by a single bond, —O—, —S—, —C(=O)—, —CH(OH)—, —S(=O)$_2$—, —NH—, —Si(CH$_3$)$_2$—, —(CH$_2$)$_p$— (wherein, 1≤p≤10), —(CF$_2$)$_q$— (wherein 1≤p≤10), C(CH$_3$)$_2$—, —C(CF$_3$)$_2$—, or —C(=O)NH—, and 0<x≤1.

When the heat resistance porous layer of the separator for a lithium rechargeable battery includes the sulfonic acid group-containing polysulfone represented by Chemical Formula 3, the separator has improved heat resistance, and traps eluted metal ions effectively and thus improves battery performance.

In Chemical Formula 3, x denotes a mole ratio (or a hydrophilic unit) of a unit substituted with a sulfonic acid group, and may be, for example 0<x<1, 0<x≤0.9, 0<x≤0.8, or 0.1≤x≤0.7.

In Chemical Formulae 2 and 3, specific examples of a and b are the same as in Chemical Formula 1.

The R$^1$ of Chemical Formula 2 and the R$^1$ and R$^2$ of Chemical Formula 3 may be, for example, a C6 to C30 arylene group or a C3 to C30 hetero cyclic group. For example, R$^1$ of Chemical Formula 2 and the R$^1$ and R$^2$ of Chemical Formula 3 may independently be selected from the following structural formulae.

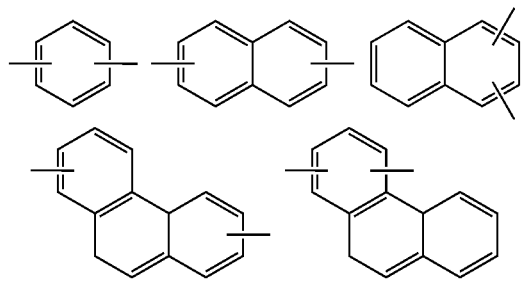

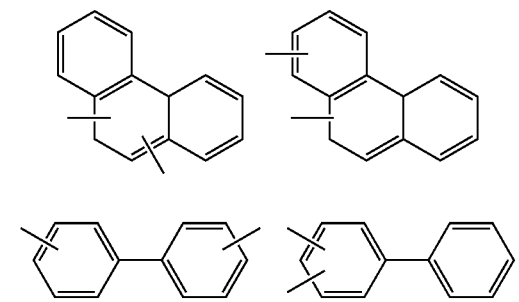

-continued

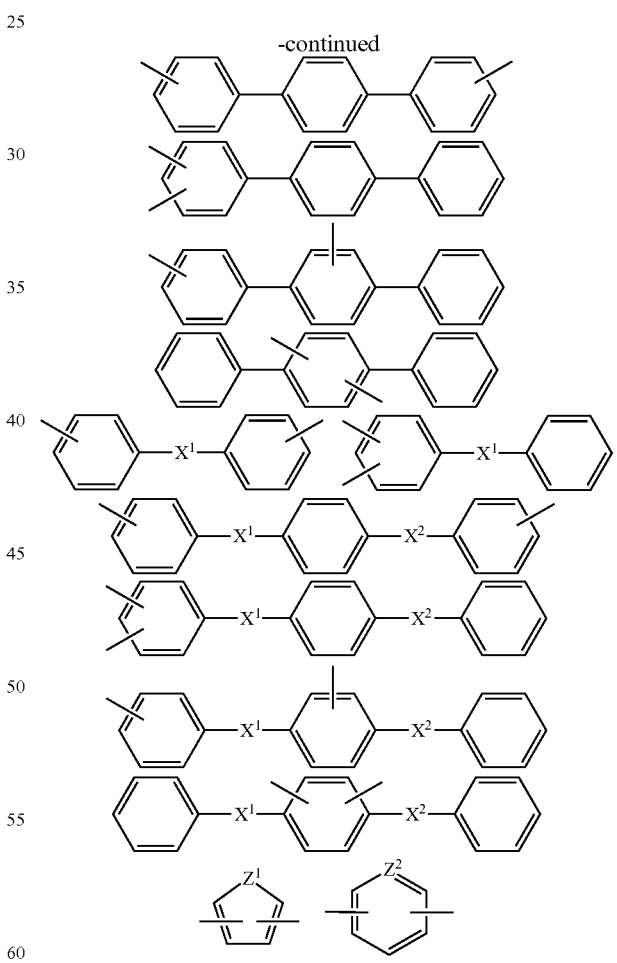

In the structural formulae, X$^1$ and X$^2$ are the same or different and are independently O, S, C(=O), CH(OH), S(=O)$_2$, NH, Si(CH$_3$)$_2$, (CH$_2$)$_p$ (wherein 1≤p≤10), (CF$_2$)$_q$ (wherein 1≤q≤10), C(CH$_3$)$_2$, C(CF$_3$)$_2$, or C(=O)NH. In the structural formulae, Z$^1$ is O, S, CR$^{101}$R$^{102}$, or NR$^{103}$, wherein R$^{101}$, R$^{102}$ and R$^{103}$ are independently hydrogen or a C1 to C5 alkyl group. In the structural formulae, $Z^2$ is N or $CR^{104}$, wherein $R^{104}$ is hydrogen or C1 to C5 alkyl group.
For example, the $R^1$ of Chemical Formula 2 and the $R^1$ and $R^2$ of Chemical Formula 3 may be selected from the following structural formulae.
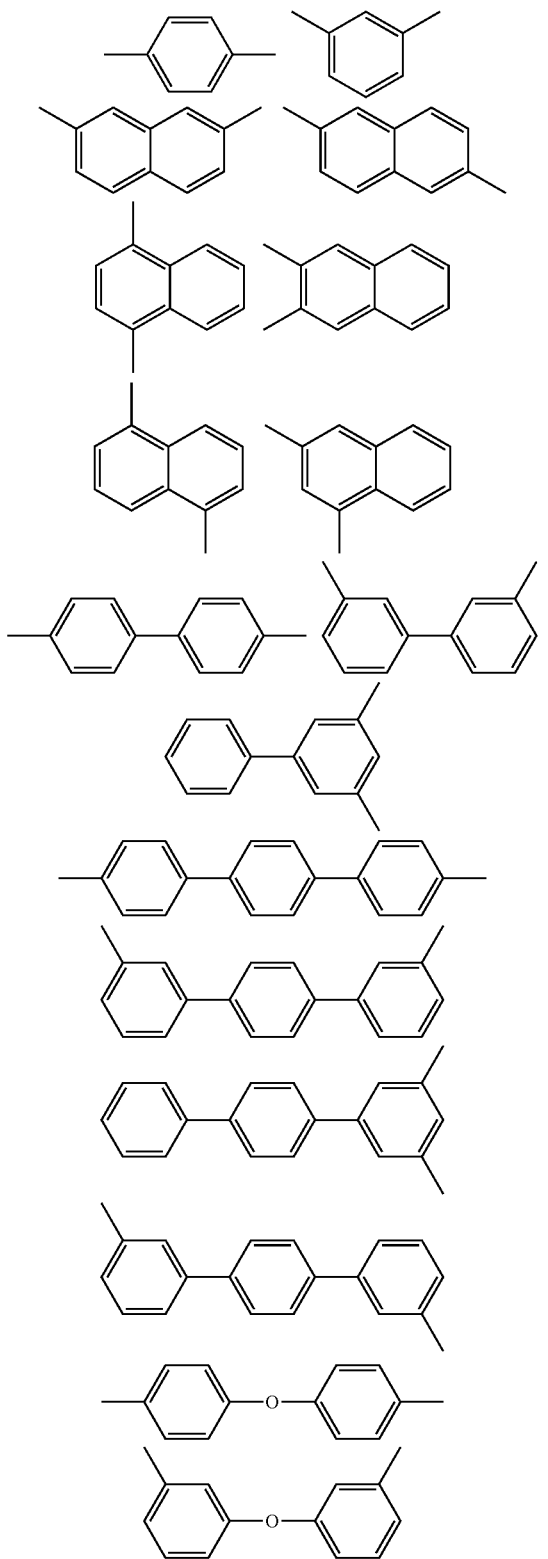
-continued
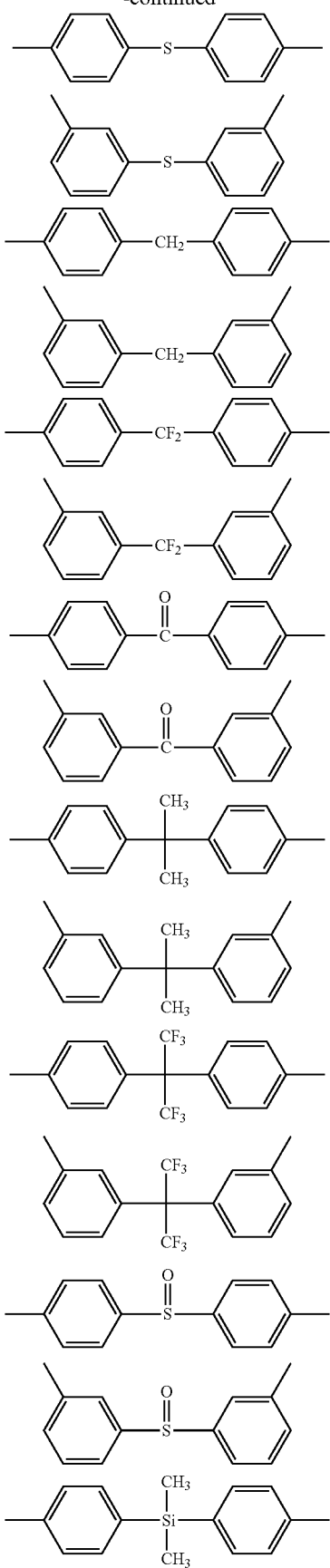

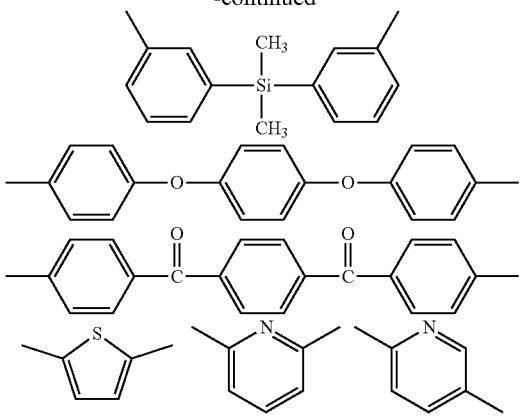

A weight average molecular weight of the sulfonic acid group-containing polysulfone may range from about 10,000 g/mol to about 500,000 g/mol, for example about 20,000 g/mol to about 200,000 g/mol. When the sulfonic acid group-containing polysulfone has a weight average molecular weight within the ranges, the heat resistance porous layer including the same has excellent heat resistance and metal ion trapping capability. The weight average molecular weight is an average molecular weight, reduced to polystyrene that is measured using gel permeation chromatography.

The sulfonic acid group-containing polysulfone may be prepared by various methods such as emulsion polymerization, suspension polymerization, massive polymerization, solution polymerization, or bulk polymerization.

The sulfonic acid group-containing polysulfone may be included in an amount of about 0.1 wt % to about 100 wt %, for example about 0.1 wt % to about 80 wt %, about 0.1 wt % to about 60 wt %, about 0.1 wt % to about 50 wt %, or about 1 wt % to about 40 wt % based on the heat resistance porous layer 30. In addition, the sulfonic acid group-containing polysulfone may be included in an amount of about 0.01 wt % to about 10 wt %, for example about 0.01 wt % to about 7 wt %, or about 0.01 wt % to about 5 wt % based on the separator 10 for a lithium rechargeable battery.

The heat resistance porous layer 30 according to an embodiment may further include a filler in addition to the sulfonic acid group-containing polysulfone. When the heat resistance porous layer 30 includes the sulfonic acid group-containing polysulfone and the filler, the sulfonic acid group-containing polysulfone may function as a kind of a binder.

The filler may improve heat resistance of the separator and thus prevent a separator from being sharply contracted or transformed as a temperature is increased. The filler may be, for example, an inorganic filler, an organic filler, an organic/inorganic filler, or a combination thereof. The inorganic filler may be a ceramic material capable of improving heat resistance, for example a metal oxide, a semi-metal oxide, a metal fluoride, a metal hydroxide, or a combination thereof. The inorganic filler may be, for example $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but is not limited thereto. The organic filler may include an acrylic compound, an imide compound, an amide compound, or a combination thereof, but is not limited thereto. The organic filler may have a core-sell structure, but is not limited thereto.

The filler may have a spherical shape or sheet shape. An average particle diameter of the filler may range about 1 nm to about 2500 nm, for example about 20 nm to about 2000 nm, or about 30 nm to about 1000 nm, for another example about 50 nm to about 800 nm, or about 50 nm to about 500 nm. The average particle diameter of the filler is a number average particle diameter measured using a laser particle diameter analyzer or an electrical resistance particle diameter analyzer. When the filler has an average particle diameter with the ranges, the heat resistance porous layer has a desirable strength and heat resistance, durability, and stability of the separator may be improved. The filler may be used by mixing two or more different kinds of fillers or two or more fillers having different sizes.

The filler may be included in an amount of about 50 wt % to about 99 wt % based on the heat resistance porous layer 30. In an embodiment, the filler may be included in an amount of about 60 wt % to about 99 wt %, for example about 70 wt % to about 99 wt %, about 75 wt % to about 99 wt %, or about 80 wt % to about 99 wt % based on the heat resistance porous layer 30. When the filler is included within the ranges, the separator for a rechargeable battery according to an embodiment has excellent heat resistance, durability and stability.

The sulfonic acid group-containing polysulfone may be included in an amount of about 0.1% to about 40% and the filler may be included in an amount of about 60% to about 99.9% based on the total weight of the sulfonic acid group-containing polysulfone and the filler. For example, the sulfonic acid group-containing polysulfone may be included in an amount of about 0.1% to about 30%, or about 0.1% to about 20% and the filler may be included in an amount of about 70% to about 99.9%, or about 80% to about 99.9% based on the total weight of the sulfonic acid group-containing polysulfone and the filler. When the heat resistance porous layer 30 includes the sulfonic acid group-containing polysulfone and the filler within the ranges, a separator for a lithium rechargeable battery including the heat resistance porous layer 30 has improved heat resistance and simultaneously traps eluted metal ions effectively and thus improves performance of a lithium rechargeable battery.

The heat resistance porous layer 30 may further include an additional binder in addition to the sulfonic acid group-containing polysulfone and the filler. The additional binder may play a role of fixing the filler on the porous substrate 20 and simultaneously, provide an adhesion force to adhere the porous substrate 20 and the electrode to one surface of the heat resistance porous layer 30.

The additional binder may be a cross-linkable binder or a non-cross-linkable binder.

The cross-linkable binder may be obtained from a monomer, an oligomer, and/or a polymer having a curable functional group capable of reacting with heat and/or light, for example, a multi-functional monomer, a multi-functional oligomer, and/or a multi-functional polymer having at least two curable functional groups. The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof, but is not limited thereto.

The cross-linkable binder may be obtained from a monomer, an oligomer and/or a polymer including at least two (meth)acrylate groups, for example ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tetra(meth)acrylate, diglycerine hexa(meth)acrylate, or a combination thereof.

For example, the cross-linkable binder may be obtained from a monomer, an oligomer and/or a polymer including at least two epoxy groups, for example bisphenol A diglycidyl ether, bisphenol F diglycidyl ether, hexahydrophthalic acid glycidyl ester, or a combination thereof.

For example, the cross-linkable binder may be obtained from a monomer, an oligomer and/or a polymer including at least two isocyanate groups, for example diphenylmethane diisocyanate, 1,6-hexamethylene diisocyanate, 2,2,4 2, 2, and 4-trimethylhexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

The non-cross-linkable binder may be, for example a vinylidene fluoride-based polymer, polymethylmethacrylate, polyacrylonitrile, polyvinylpyrrolidone, polyvinylacetate, polyvinyl alcohol, polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof, but is not limited thereto.

The vinylidene fluoride-based polymer may be specifically a homopolymer including only vinylidene fluoride monomer-derived unit or a copolymer of a vinylidene fluoride-derived unit and other monomer-derived unit. The copolymer may specifically include a vinylidene fluoride-derived unit and at least one of units derived from chlorotrifluoroethylene, trifluoroethylene, hexafluoropropylene, ethylene tetrafluoride and ethylene monomers, but is not limited thereto. For example, the copolymer may be a polyvinylidene fluoride-hexafluoropropylene (PVdF-HFP) copolymer including a vinylidene fluoride monomer-derived unit and a hexafluoropropylene monomer-derived unit.

The heat resistance porous layer 30 may have a thickness of about 0.01 μm to about 20 μm, for example about 1 μm to about 10 μm, or about 1 μm to about 8 μm.

A separator for a lithium rechargeable battery according to an embodiment has excellent heat resistance, for example, a shrinkage ratio of less than or equal to about 5%, for example, less than or equal to about 3% in a machine direction (MD) and in a traverse direction (TD) after allowed to stand at about 200° C. for about 10 minutes.

In another embodiment, a method of manufacturing a separator for a lithium rechargeable battery is provided. The manufacturing method includes dispersing a sulfonic acid group-containing polysulfone in a low-boiling-point solvent into a nano-size to prepare nano dispersion liquid, and applying the nano dispersion liquid on at least one surface of the porous substrate.

The sulfonic acid group-containing polysulfone is not dissolved in a low-boiling-point solvent but only in a high-boiling-point solvent having a boiling point of greater than about 150° C., for example, N-methylpyrrolidone (NMP), dimethylformamide (DMF), dimethylsulfoxide (DMSO), and the like. In general, a compound only dissolved in a high-boiling-point solvent such as the sulfonic acid group-containing polysulfone may be difficult to apply to a heat resistance porous layer of a separator for a lithium rechargeable battery. The reason is that the separator may be transformed and damaged and also cost high and take long time during a process of evaporating and removing the high-boiling-point solvent after coating the compound dissolved in the high-boiling-point solvent on the surface of the porous substrate at a high temperature of greater than or equal to about 150° C.

According to an embodiment, the sulfonic acid group-containing polysulfone that is insoluble in a low-boiling-point solvent may be included in the heat resistance porous layer by dispersing the sulfonic acid group-containing polysulfone in a low-boiling-point solvent into a nano-size and applying the nano dispersion liquid on the surface of the porous substrate.

The sulfonic acid group-containing polysulfone may be dispersed in a low-boiling-point solvent into a nano-size by a supercritical reaction. The supercritical reaction refers to a reaction under a supercritical condition, using a high temperature and high pressure reactor. For example, the supercritical reaction may be performed at a temperature of about 80° C. to about 500° C. at a pressure condition of about 10 bar to about 200 bar. For example, a low-boiling-point solvent is put in a high temperature and high pressure reactor and dried sulfonic acid group-containing polysulfone is put therein in an amount of less than or equal to about 20 wt %, and then a supercritical reaction is performed at about 200° C. at about 60 bar for about 2 hours.

In the nano dispersion liquid, an average size of the sulfonic acid group-containing polysulfone may range from about 1 nm to about 900 nm, for example about 1 nm to about 800 nm, or about 10 nm to about 800 nm.

The low-boiling-point solvent may be a solvent having a boiling point of less than or equal to about 150° C., or less than or equal to about 100° C., for greater than or equal to about 30° C. and less than or equal to about 100° C. For example the low-boiling-point solvent may be water, alcohol, acetone, methylethylketone, tetrahydrofuran, dimethylformaldehyde, cyclohexane, or a combination thereof.

The low-boiling-point solvent may be easily removed at a temperature of less than or equal to about 100° C. after applying the nano dispersion liquid on at least one surface of the porous substrate, which makes a method of manufacturing a separator easy and the sulfonic acid group-containing polysulfone be introduced in the heat resistance porous layer.

In the method of manufacturing a separator for a lithium rechargeable battery, the nano dispersion liquid may be, for example applied on at least one surface of the porous substrate by coating the nano dispersion liquid on at least one surface of the porous substrate. The coating may be, for example spin coating, dip coating, bar coating, die coating, slit coating, roll coating, inkjet printing, and the like, but is not limited thereto.

The method of manufacturing a separator for a lithium rechargeable battery may further include removing a low-boiling-point solvent after applying the nano dispersion liquid on at least one surface of the porous substrate. The removing of the low-boiling-point solvent may be performed through drying with warm air, hot air, or low humid air, vacuum-drying, or radiation of a far-infrared ray, an electron beam, and the like, but the present disclosure is not limited thereto.

The method of manufacturing a separator for a lithium rechargeable battery according to an embodiment may include adding the filler to the nano dispersion liquid. That is, the method of manufacturing the separator may include dispersing a sulfonic acid group-containing polysulfone in a low-boiling-point solvent into a nano-size to prepare nano dispersion liquid, adding the filler to the nano dispersion liquid, and applying the nano dispersion liquid including the filler on at least one surface of the porous substrate. In this case, manufactured is a separator that includes a heat resistance porous layer including the sulfonic acid group-containing polysulfone and the filler on at least one surface of the porous substrate. The filler is the same as described above.

The method of manufacturing the separator may include adding the additional binder to the nano dispersion liquid, which further improves adherence of the heat resistance porous layer. The additional binder is the same as described above.

Hereinafter, a lithium rechargeable battery including the separator for a rechargeable battery is described.

A lithium rechargeable battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for the batteries pertaining to this disclosure are well known in the art.

Figure 2:
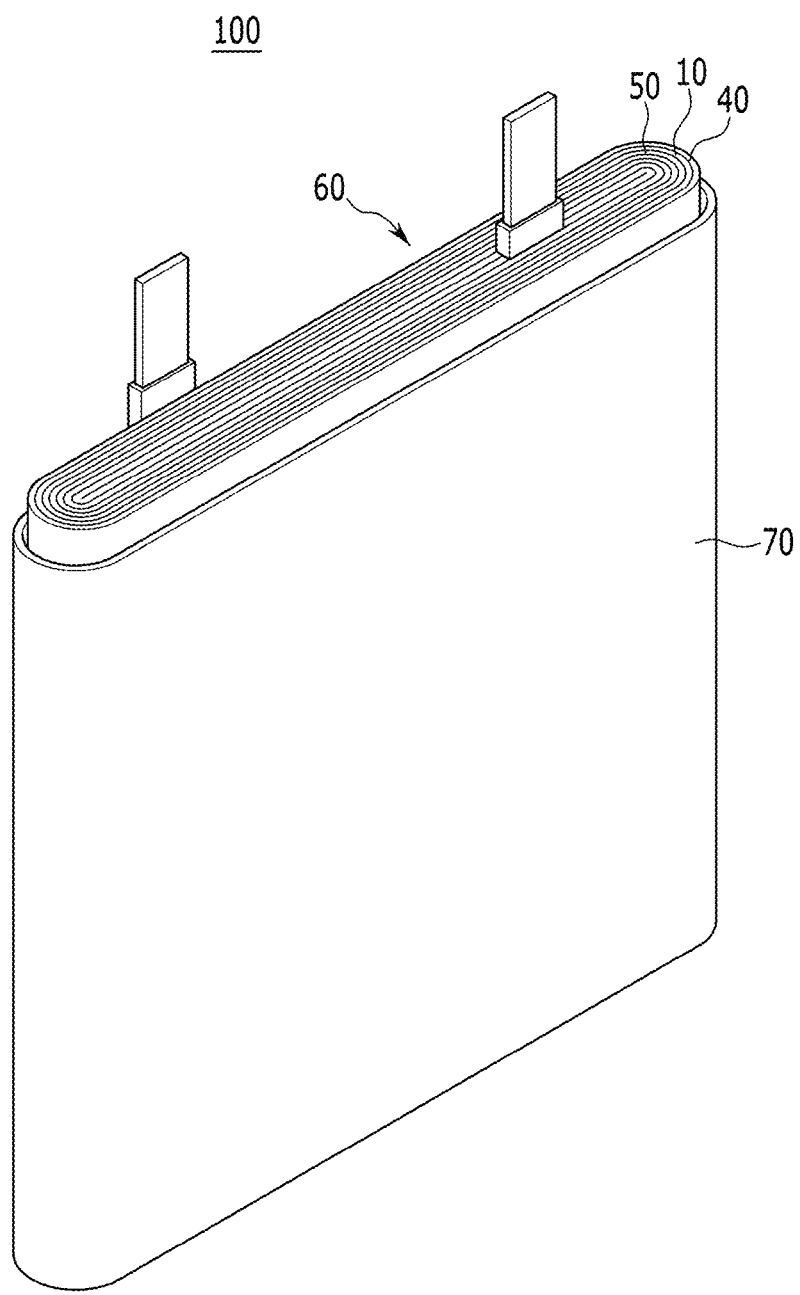
FIG. 2 is an exploded perspective view showing a lithium rechargeable battery according to an embodiment.

Herein, as an example of a lithium rechargeable battery, a prismatic lithium rechargeable battery is for example described. FIG. 2 is an exploded perspective view showing a lithium rechargeable battery according to an embodiment. Referring to FIG. 2, a lithium rechargeable battery 100 according to one embodiment includes an electrode assembly 60 manufactured by interposing a separator 10 between a positive electrode 40 and a negative electrode 50 and winding them, and a case 70 housing the electrode assembly 60.

The electrode assembly 60 may have for example a jelly-roll shape formed by winding the positive electrode 40, the negative electrode 50, and the separator 10 interposed therebetween.

The positive electrode 40, the negative electrode 50, and the separator 10 are impregnated in an electrolyte solution (not shown).

The positive electrode 40 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound being capable of intercalating and deintercalating lithium. Specifically, as the positive active material, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

In an embodiment, the positive active material may include nickel. The positive active material including nickel realizes high capacity and provides a battery having improved performance and large capacity. The positive active material may be, for example, a lithium nickel oxide, a lithium nickel manganese oxide, a lithium nickel cobalt oxide, a lithium nickel aluminum oxide, a lithium nickel cobalt manganese oxide, or a lithium nickel cobalt aluminum oxide.

In the positive active material, the nickel may be included in an amount of greater than or equal to about 60 mol %, for example greater than or equal to about 70 mol %, greater than or equal to about 80 mol %, or greater than or equal to about 90 mol % and less than or equal to about 99 mol % or less than or equal to about 90 mol % based on the total amount of metal components except lithium.

The positive active material including lithium nickel-based oxide containing nickel in a high amount may realize high capacity and improve electrochemical properties of a battery. However, a lithium rechargeable battery manufactured by applying the nickel-based positive active material may have a problem that nickel ions are eluted from a positive electrode during the operation and deposited on a negative electrode and thus aggravating battery safety and deteriorating battery performance such as charge and discharge efficiency, cycle-life characteristics, and the like. According to an embodiment, the nickel-based positive active material to the positive electrode to realize high capacity and simultaneously, the separator may be applied to solve the nickel elution problem and thus to improve safety and performance of a battery.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 50 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be may be graphite such as amorphous, sheet-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof. The transition metal oxide may be vanadium oxide, lithium vanadium oxide, and the like.

The binder and the conductive material used in the negative electrode may be the same as the binder and conductive material of the positive electrode.

The positive electrode 40 and the negative electrode 50 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent a lithium salt.

The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear or branched or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the rechargeable lithium battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but is not limited thereto.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

Hereinafter, the above aspects of the present disclosure are illustrated in more detail with reference to examples. However, these examples are exemplary, and the present disclosure is not limited thereto.

EXAMPLE: MANUFACTURE OF SEPARATOR

Example 1

4,4'-dichlorodiphenylsulfone (DCDPS), 4,4'-dihydroxybiphenyl (BP), and 3,3'-disulfonate-4,4'-dichlorodiphenylsulfone (SDCDPS) in a mole ratio of 50/100/50 are put in a 3-necked flask containing N-methylpyrrolidone, toluene, and $K_2CO_3$, and the mixture is refluxed at 160° C. for 4 hours and reacted at 190° C. for 16 hours. A product therein is washed and then, reacted in 0.1 M boiling sulfuric acid for 2 hours and in boiling water for 2 hours to convert sulfonate salt from an Na-type (—$SO_3Na$) and a K-type (—$SO_3K$) into a H type (—$SO_3H$). Subsequently, a product therefrom is treated in a 0.1 M LiCl solution for 48 hours and in ultrapure water for 48 hours to obtain Li-type (—$SO_3Li$) sulfonic acid group-containing polysulfone. The obtained compound is 4,4'-biphenol disulfonated polyaryleneether sulfone and may be represented by Chemical Formula 11.

[Chemical Formula 11]

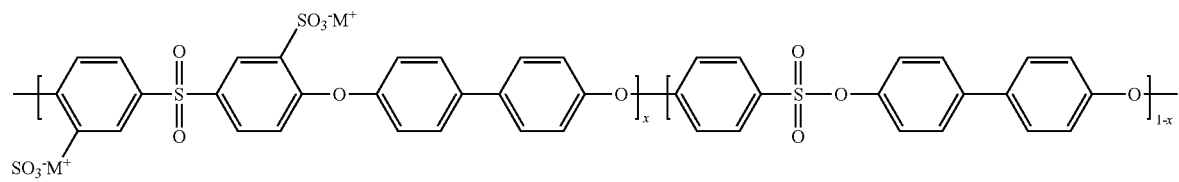

In Chemical Formula 11, x is about 0.5 and $M^+$ is $Li^+$.

The sulfonic acid group-containing polysulfone in an amount of 5 wt % is put in a mixed solvent of water and isopropyl alcohol in a volume ratio of 75/25, and a supercritical reaction is performed at about 200° C. under 60 bar for 2 hours to prepare a nano dispersion liquid.

The nano dispersion liquid is diluted with acetone to have a solid content of 0.5 wt % and then, dip-coated on a polyethylene porous substrate (SKI 612HS) and dried at 80° C. for 10 minutes to manufacture a separator for a lithium rechargeable battery having a heat-resistant porous layer including the sulfonic acid group-containing polysulfone.

Figure 3:
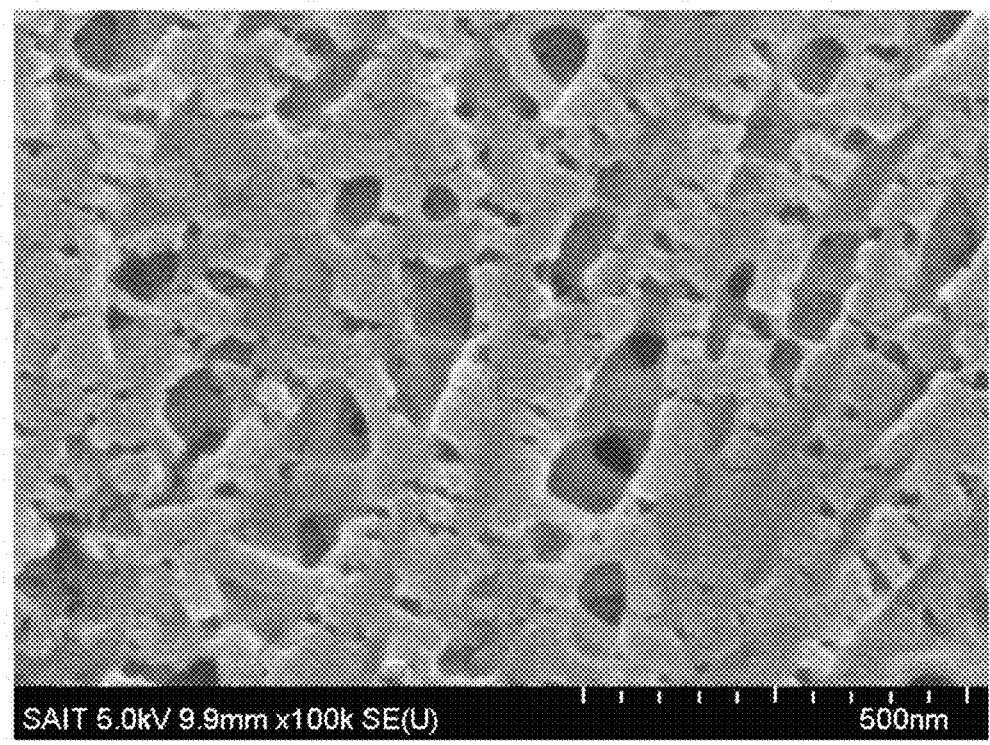
FIG. 3 is a scanning electron microscope photograph of one surface of the separator for a lithium rechargeable battery according to Example 1.

FIG. 3 is a scanning electron microscope (SEM) photograph showing one surface of the separator for a lithium rechargeable battery according to Example 1. In FIG. 3, the surface of the separator is coated with the sulfonic acid group-containing polysulfone.

Example 2

Polyvinyl alcohol (PVA) in the equivalent amount to 10 wt % of the sulfonic acid group-containing polysulfone according to Example 1 is added to a nano dispersion liquid of the sulfonic acid group-containing polysulfone, and an inorganic particle (boehmite) in a weight ratio of 1:10 with the total weight of the sulfonic acid group-containing polysulfone and the polyvinyl alcohol is added thereto.

A dispersion in which the sulfonic acid group-containing polysulfone nano particle, the polyvinyl alcohol, and the inorganic particle are dispersed is bar-coated on one surface of a polyethylene porous substrate (SKI 612HS) to manufacture a separator for a lithium rechargeable battery.

Figure 4:
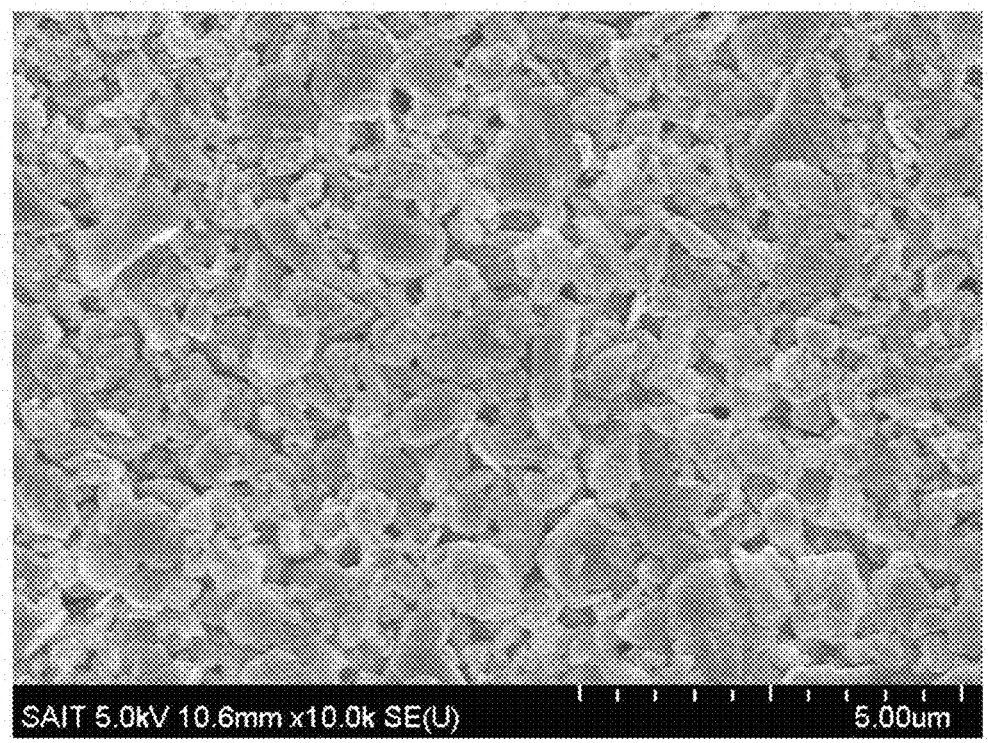
FIG. 4 is a scanning electron microscope photograph of one surface of the separator for a lithium rechargeable battery according to Example 2.

FIG. 4 is a scanning electron microscope showing the surface of the separator for a lithium rechargeable battery according to Example 2.

Comparative Example 1

A polyethylene porous substrate (SKI 612HS) is used as a separator for a lithium rechargeable battery.

Comparative Example 2

A solution obtained by putting the sulfonic acid group-containing polysulfone represented by Chemical Formula 11 in a mixed solvent of water and isopropylalcohol but not dispersing the mixture into nano particles is used instead of the nano dispersion liquid of Example 1. Except for the above, a separator for a lithium rechargeable battery is manufactured according to the same method as Example 1.

Comparative Example 3

A solution obtained by putting the sulfonic acid group-containing polysulfone represented by Chemical Formula 11 in a mixed solvent of water and isopropylalcohol but not dispersing the mixture into nano particles is used instead of the nano dispersion liquid of Example 2. Except for the above, a separator for a lithium rechargeable battery is manufactured according to the same method as Example 2.

Comparative Example 4

A separator for a lithium rechargeable battery is manufactured according to the same method as Example 2 except for using a sodium carboxylmethyl cellulose salt (CMC, Sigma-Aldrich Co., Ltd.) instead of the sulfonic acid group-containing polysulfone.

Comparative Example 5

A separator for a lithium rechargeable battery is manufactured according to the same method as Example 2 except for using poly(sodium 4-styrenesulfonate) (PSS, Sigma-Aldrich Co., Ltd.) instead of the sulfonic acid group-containing polysulfone.

Comparative Example 6

A separator for a lithium rechargeable battery is manufactured according to the same method as Example 2 except for using poly(sodium vinylsulfonate salt) (PVS, Sigma-Aldrich Co., Ltd.) instead of the sulfonic acid group-containing polysulfone.

Comparative Example 7

A separator for a lithium rechargeable battery is manufactured according to the same method as Example 2 except for reacting a lithium polyacrylate salt (PAA, Sigma-Aldrich Co., Ltd.) with LiOH instead of the sulfonic acid group-containing polysulfone.

Each composition of the heat resistance porous layers of the separators according to Examples 1 to 2 and Comparative Examples 1 to 7 is shown in Table 1.

TABLE 1

|  | Organic material | Filler | Solid content in composition formula (wt %) | Weight ratio of Organic material:Inorganic material | Note |
|---|---|---|---|---|---|
| Ex. 1 | Chemical Formula 11 (nano dispersion liquid) | — | 0.5 | — | Dip coating |
| Ex. 2 | Chemical Formula 11 (nano dispersion liquid) + PVA | boehmite | 13 | 1:10 | Cross-section bar coating |
| Comp. Ex. 1 | — | — | — | — | polyethylene substrate |
| Comp. Ex. 2 | Chemical Formula 11 | — | 0.5 | — | Dip coating |
| Comp. Ex. 3 | Chemical Formula 11 + PVA | boehmite | 13 | 1:10 | Cross-section bar coating |
| Comp. Ex. 4 | CMC + PVA | boehmite | 13 | 1:10 | Cross-section bar coating |
| Comp. Ex. 5 | PSS + PVA | boehmite | 13 | 1:10 | Cross-section bar coating |

TABLE 1-continued

|  | Organic material | Filler | Solid content in composition formula (wt %) | Weight ratio of Organic material:Inorganic material | Note |
|---|---|---|---|---|---|
| Comp. Ex. 6 | PVS + PVA | boehmite | 13 | 1:10 | Cross-section bar coating |
| Comp. Ex. 7 | PAA + PVA | boehmite | 13 | 1:10 | Cross-section bar coating |

Evaluation Example 1: Nickel Ion Adsorption Capability of Separator

The separators according to Examples 1 and 2 and Comparative Examples 1 to 4 are respectively put in a 10 mM solution prepared by dissolving $Ni(ClO_4)_2$ and then, stirred for 2 hours and three times washed with dimethyl carbonate (DMC), a nickel amount remaining on the separators is analyzed, and the results are shown in Table 2. Herein, the electrolyte solution is prepared by mixing ethylene carbonate, ethylmethyl carbonate, and diethyl carbonate in a volume ratio of 3:5:2 and adding 1.15 M of $LiPF_6$ thereto.

TABLE 2

|  | Nickel ion adsorption amount of separator (ppm) |
|---|---|
| Example 1 | 1600 |
| Example 2 | 1490 |
| Comparative Example 1 | 0 |
| Comparative Example 2 | — |
| Comparative Example 3 | — |
| Comparative Example 4 | 560 |

In Evaluation Example 1 and the following Evaluation Examples, Comparative Examples 2 and 3 fail in obtaining a composition and thus uniformly coating it and controlling air permeability, and accordingly, the experiment results are not shown.

Referring to Table 2, the separators of Examples 1 to 2 show superbly higher nickel ion adsorption capability than the separators of Comparative Examples 1 to 4.

Evaluation Example 2: Heat Resistance

The separators according to Example 2 and Comparative Examples 4 to 7 are allowed to stand at 200° C. for 10 minutes, and then, their shrinkage ratio s in a machine direction and in a traverse direction are measured, and the results are shown in Table 3.

TABLE 3

|  | Thermal shrinkage ratio (%) | |
|---|---|---|
|  | machine direction (MD) | traverse direction (TD) |
| Example 2 | <2 | <2 |
| Comparative Example 4 | 18 | 20 |
| Comparative Example 5 | 16 | 20 |
| Comparative Example 6 | 20 | 23 |
| Comparative Example 7 | >50 | >50 |

Referring to Table 3, the separator of Example 2 shows a remarkably low thermal shrinkage ratio in a direction and in a traverse direction and thus excellent heat resistance compared with the separators of Comparative Examples 4 to 7.

Preparation Examples 1 to 2 and Comparative Preparation Examples 1 to 4: Manufacture of Lithium Rechargeable Battery Cell A NCA active material, $LiNi_{0.88}Co_{0.105}Al_{0.015}O_2$, polyvinylidene fluoride, and carbon black in a weight ratio of 92:4:4 are added to an N-methylpyrrolidone solvent to prepare slurry. The slurry is coated on an aluminum thin film and then, dried and compressed to manufacture a positive electrode.

Graphite, styrene butadiene rubber (SBR), and carboxylmethyl cellulose sodium salt (CMC) in a weight ratio of 97.5:1.5:1 are added to water to prepare slurry. The slurry is coated on a copper foil, dried, and compressed to manufacture a negative electrode.

The separators of Examples 1 to 2 and Comparative Examples 1 to 4 are respectively interposed between the positive and negative electrodes, and an electrolyte solution prepared by mixing ethylene carbonate, ethylmethyl carbonate, and diethyl carbonate in a volume ratio of 3:5:2 and adding 1.15 M of $LiPF_6$ to the mixed solvent is injected thereinto to manufacture a 2032 coin cell.

Evaluation Example 3: Nickel Amount Eluted in Negative Electrode

The lithium rechargeable battery cells according to Preparation Examples 1 to 2 and Comparative Preparation Examples 1 to 4 are respectively decomposed after 100 cycles at 2.8 V to 4.35 V, and then, the negative electrodes therefrom are sufficiently washed with dimethyl carbonate (DMC), each nickel amount deposited on the negative electrodes is measured, and the results are shown in Table 4.

Figure 5:
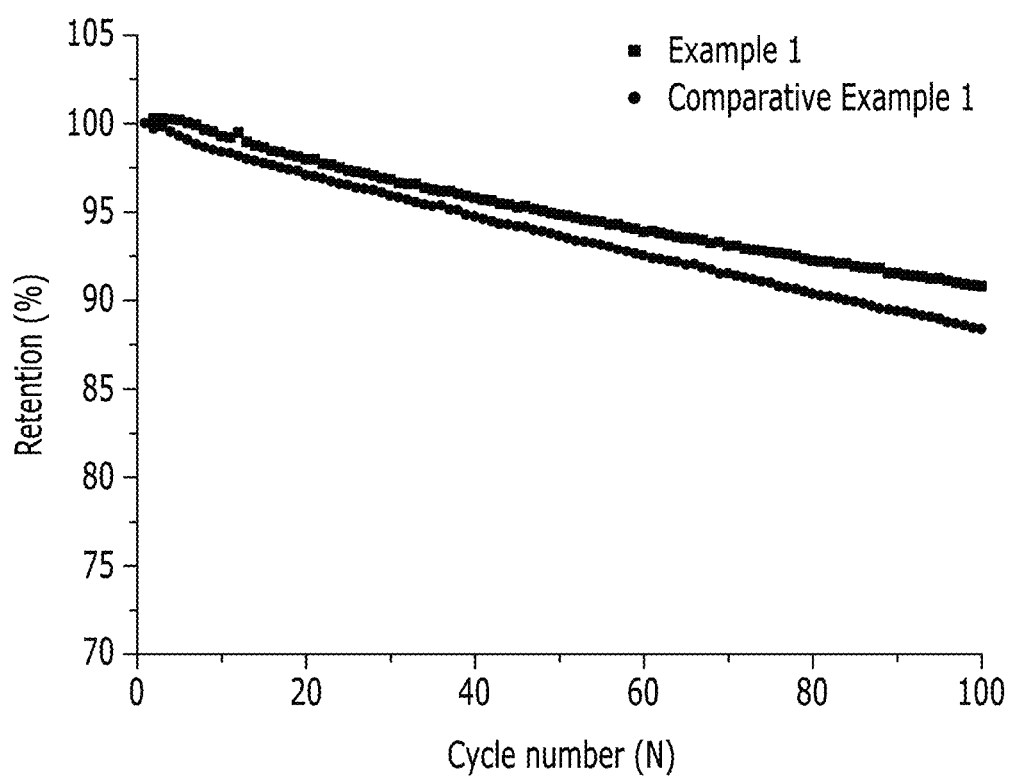
FIG. 5 is a graph showing cycle-life characteristics of lithium rechargeable battery cells according to Preparation Example 1 and Comparative Preparation Example 1.
Figure 6:
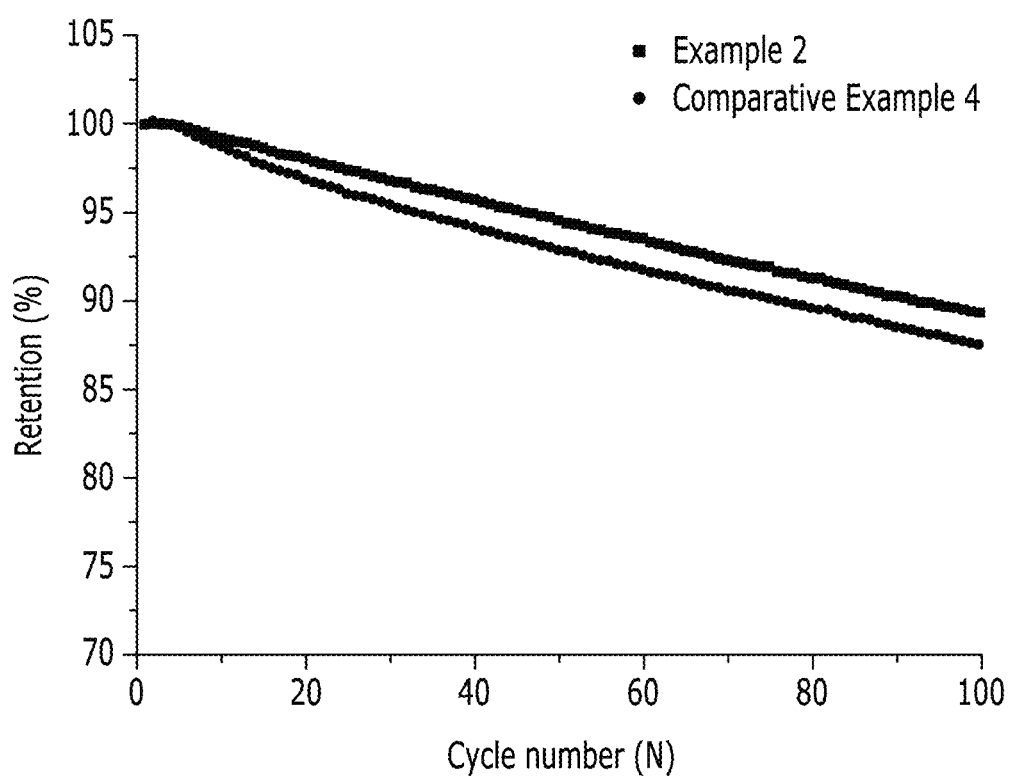
FIG. 6 is a graph showing cycle-life characteristics of lithium rechargeable battery cells according to Preparation Example 2 and Comparative Preparation Example 4.

Evaluation Example 4: Cycle-Life Characteristics of Lithium Rechargeable Battery Cell Capacity retentions of the lithium rechargeable battery cells according to Preparation Examples 1 to 2 and Comparative Preparation Examples 1 to 4 is measured after 100 cycles at 2.8 V to 4.35 V, and the results are shown in Table 4. In addition, FIG. 5 is a graph showing cycle-life characteristics of the cells according to Preparation Example 1 and Comparative Preparation Example 1, and FIG. 6 is a graph showing cycle-life characteristics of the cells according to Preparation Example 2 and Comparative Preparation Example 2.

TABLE 4

| | Amount of deposited nickel on negative electrode (ppm) | Capacity retention after 100 cycles (%) |
|---|---|---|
| Preparation Example 1 | 90 | 90.8 |
| Preparation Example 2 | 110 | 89.3 |
| Comparative Preparation Example 1 | 160 | 88.4 |
| Comparative Preparation Example 2 | — | — |
| Comparative Preparation Example 3 | — | — |
| Comparative Preparation Example 4 | 140 | 87.5 |

Referring to Table 4, the lithium rechargeable battery cells of Preparation Examples 1 to 2 show a remarkably low nickel amount deposited on the negative electrodes compared with the cells of Comparative Preparation Examples. The reason is that the sulfonic acid group-containing polysulfone introduced into a heat resistance porous layer of the separator of Example effectively traps nickel ions eluted from the positive electrode and suppresses deposition of the nickel ions on the negative electrode.

In addition, referring to Table 4 and FIGS. 5 and 6, the lithium rechargeable battery cells of Preparation Examples 1 to 2 show excellent cycle-life characteristics compared with the cells of Comparative Preparation Examples. Accordingly, the separator of Example may be applied to improve performance of a lithium rechargeable battery cell.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A separator for a lithium rechargeable battery, comprising
a porous substrate and heat resistance porous layer disposed on at least one surface of the porous substrate,
wherein the heat resistance porous layer includes sulfonic acid group-containing polysulfone.

2. The separator of claim 1, wherein the sulfonic acid group-containing polysulfone includes a unit represented by Chemical Formula 1:

[Chemical Formula 1]

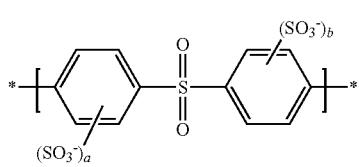

wherein, in Chemical Formula 1,
a and b are independently numbers of 0 to 4, the sum of a and b is greater than or equal to 1.

3. The separator of claim 1, wherein the sulfonic acid group-containing polysulfone is sulfonic acid group-containing polyarylene ethersulfone.

4. The separator of claim 1, wherein the sulfonic acid group-containing polysulfone includes a unit represented by Chemical Formula 2:

[Chemical Formula 2]

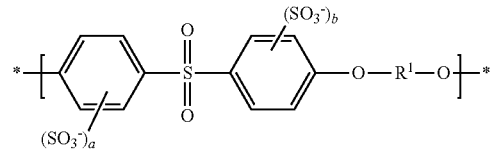

wherein, in Chemical Formula 2,
a and b are independently numbers of 0 to 4, the sum of a and b is greater than or equal to 1, and
$R^1$ is a divalent functional group including a C3 to C30 aromatic ring, wherein the aromatic ring is present alone or two or more aromatic rings are linked by a single bond, —O—, —S—, —C(=O)—, —CH(OH)—, —S(=O)$_2$—, —NH—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH.

5. The separator of claim 1, wherein the sulfonic acid group-containing polysulfone includes a unit represented by Chemical Formula 3:

[Chemical Formula 3]

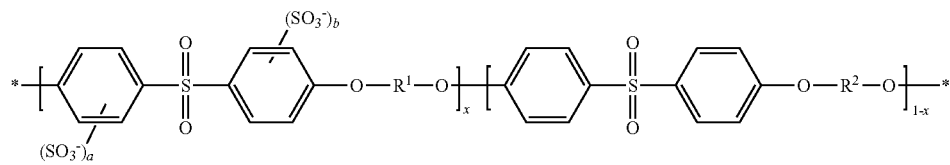

wherein, in Chemical Formula 3,
a and b are independently numbers of 0 to 4, the sum of a and b is greater than or equal to 1,
$R^1$ and $R^2$ are the same or different and are independently a divalent functional group including a C3 to C30 aromatic ring, wherein the aromatic ring is present alone or two or more aromatic rings are linked by a single bond, —O—, —S—, —C(=O)—, —CH(OH)—, —S(=O)$_2$—, —NH—, —Si(CH$_3$)$_2$—, —(CH$_2$)$_p$— (wherein 1≤q≤10), —(CF$_2$)$_q$— (wherein 1≤q≤10), —C(CH$_3$)$_2$—, —C(CF$_3$)$_2$—, or —C(=O)NH, and
0<x≤1.

6. The separator of claim 1, wherein a weight average molecular weight of the sulfonic acid group-containing polysulfone ranges from about 20,000 g/mol to about 200,000 g/mol.

7. The separator of claim 1, wherein the heat resistance porous layer further includes a filler.

8. The separator of claim 7, wherein the filler includes $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

9. The separator of claim 7, wherein the sulfonic acid group-containing polysulfone is included in an amount of about 0.1% to about 40% and the filler is included in an amount of about 60% to about 99.9% based on the total weight of the sulfonic acid group-containing polysulfone and the filler.

10. A method of manufacturing a separator for a lithium rechargeable battery, comprising
dispersing a sulfonic acid group-containing polysulfone in a low-boiling-point solvent into a nano-size to prepare nano dispersion liquid,
applying the nano dispersion liquid on at least one surface of a porous substrate, and
obtaining a separator including a heat resistance porous layer including sulfonic acid group-containing polysulfone on at least one surface of the porous substrate.

11. The method of claim 10, wherein the dispersing of the sulfonic acid group-containing polysulfone in a low-boiling-point solvent into a nano-size is performed by a supercritical reaction.

12. The method of claim 10, wherein the method further includes adding a filler to the nano dispersion liquid.

13. A lithium rechargeable battery comprising a positive electrode, a negative electrode, and the separator of claim 1 between the positive electrode and the negative electrode.

14. The lithium rechargeable battery of claim 13, wherein the positive electrode includes a current collector and a positive active material and the positive active material includes nickel.

15. The lithium rechargeable battery of claim 14, wherein in the positive active material, the nickel is included in an amount of greater than or equal to about 60 mol % based on the total amount of metal components except lithium.

* * * * *

UNITED STATES PATENT AND TRADEMARK OFFICE
CERTIFICATE OF CORRECTION

PATENT NO. : 10,985,426 B2
APPLICATION NO. : 16/326885
DATED : April 20, 2021
INVENTOR(S) : Yang et al.

It is certified that error appears in the above-identified patent and that said Letters Patent is hereby corrected as shown below:

In the Claims

Column 22, Line 57, Claim 5      Delete "$1 \leq q \leq 10$),"
Insert -- $1 \leq p \leq 10$), --

Signed and Sealed this
Twenty-second Day of August, 2023

Katherine Kelly Vidal
*Director of the United States Patent and Trademark Office*